Sept. 28, 1943.     W. R. TUTTLE     2,330,642
GRAIN CONVEYER AND STORAGE TANK
Filed Oct. 28, 1941     2 Sheets-Sheet 1
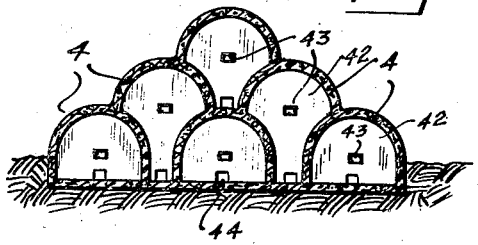
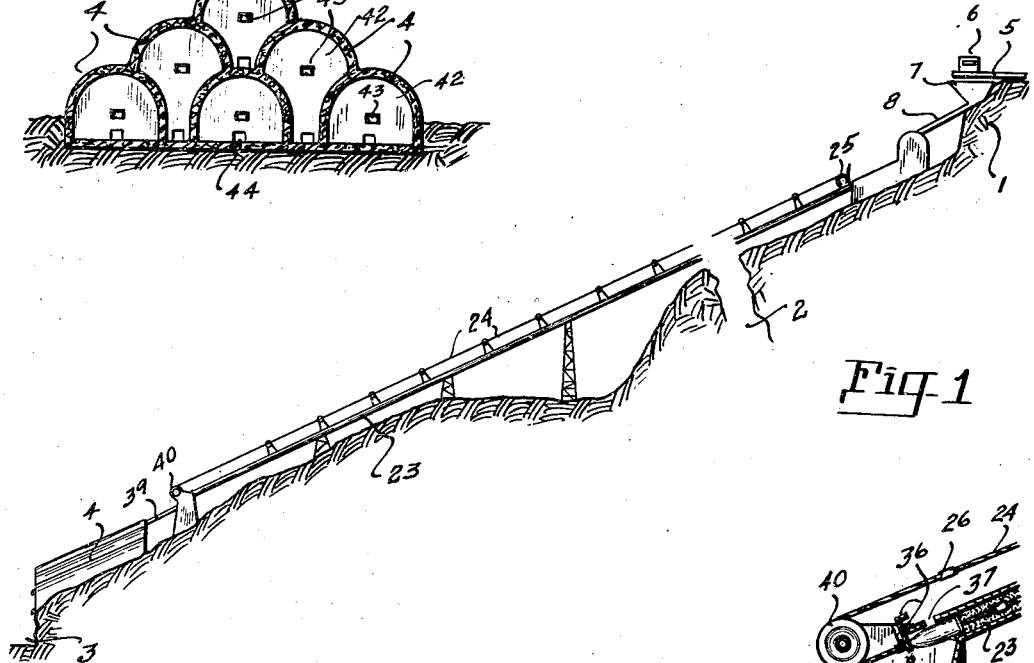
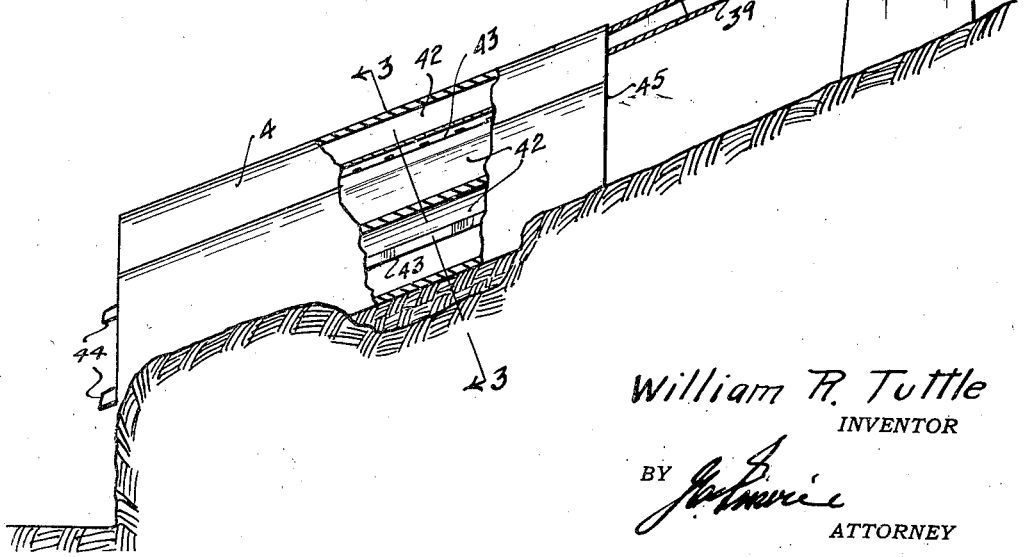
William R. Tuttle
INVENTOR
BY
ATTORNEY

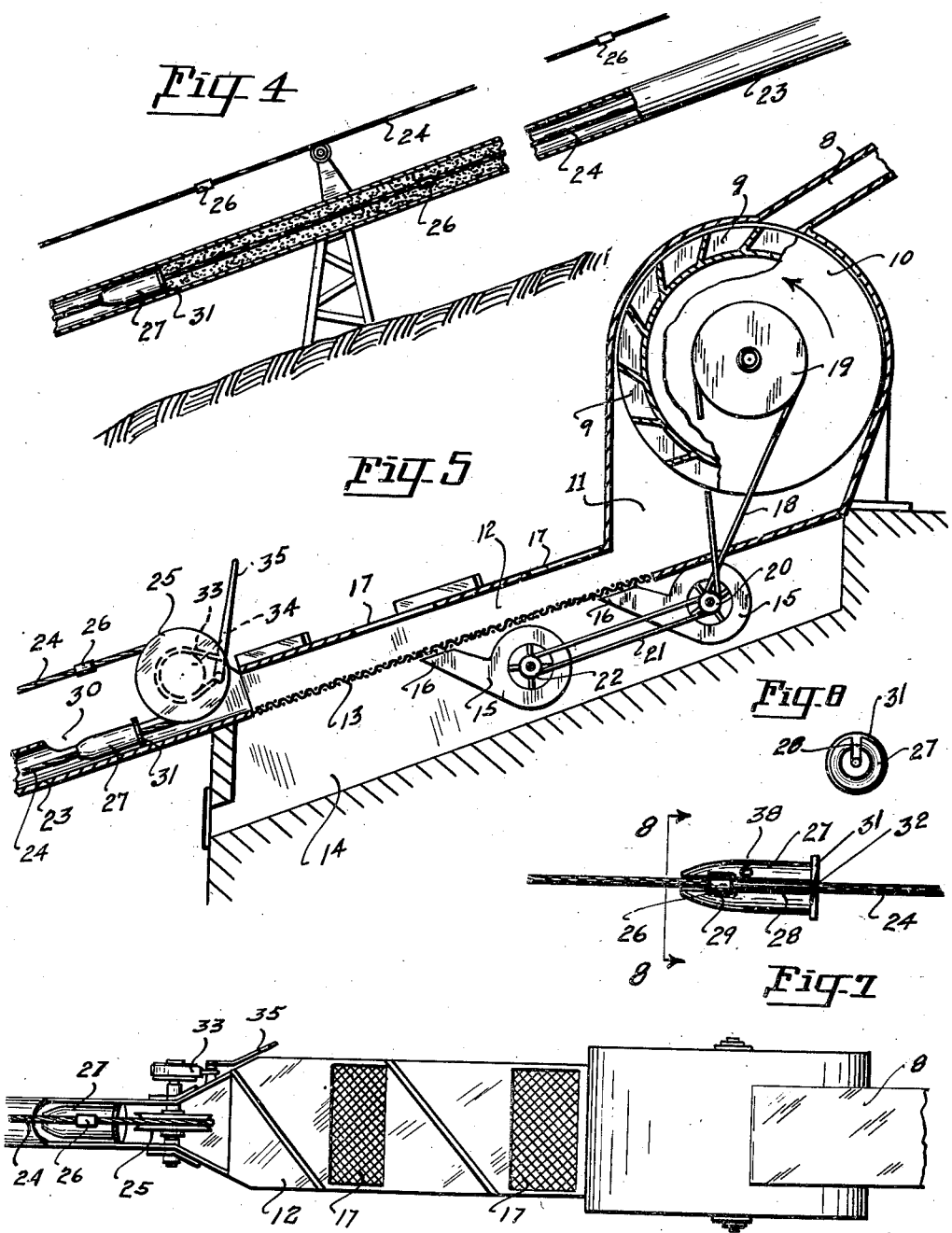

Patented Sept. 28, 1943

2,330,642

UNITED STATES PATENT OFFICE 2,330,642

GRAIN CONVEYER AND STORAGE TANK

William R. Tuttle, Elma, Wash.

Application October 28, 1941, Serial No. 416,897

7 Claims. (Cl. 214—16)

This invention relates to combination conveyers and storage bins, and is particularly adapted to be used for conveying grain and the storage thereof.

The primary object of the invention is to provide a gravity conveyer for transferring grain and the like from highlands down to storage bins located at water levels or railroad loading ports.

In localities where wheat farming is located on highlands, my gravity conveyer is designed to provide at least a 33 degree slope down to a level where water or rail transportation is available. The distance that these conveyers may cover depends entirely on the location. In my new and improved conveyer system, I eliminate hauling grain for miles with trucks then having to elevate the grain by machinery up into storage bins. In my invention weighing platforms are located on the highlands where the grains are dumped into a hopper of the conveyer.

Suitable means is provided for weighing and classifying the grain at the upper end of the conveyer, a retarding means is provided for slowing up the speed of the grain within the conveyers. When the grain reaches the bottom of the conveyer, means is provided for distributing the different grades of grain to storage bins. These storage bins are also built on an incline and above the loading station relative to the railroad or other transportation facilities.

Referring to the drawings:

Figure 1 is a diagrammatical layout of a hillside, having my new and improved combination conveyer and storage bin erected thereon.

Figure 2 is an enlarged fragmentary view, partially in section, of the distributing end of the conveyer and the storage bins.

Figure 3 is an end sectional view of the storage bins, taken on line 3—3 of Figure 2.

Figure 4 is a fragmentary intermediate sectional view of the conveyer.

Figure 5 is an enlarged fragmentary sectional view of the receiving end of the conveyer, including means for cleaning and separating the grain therethrough.

Figure 6 is a plan view of the receiving end of the conveyer.

Figure 7 is a detail view of one of the moving partitions used to separate the different grades of grain in the conveyer, also for retarding the flow of the grain down through the conveyer.

Figure 8 is an end view of Figure 7, looking in the direction indicated.

In the drawings:

The top of the highland is shown at 1, with an unlimited portion 2 of the hillside cut away. The lower end of the hillside may terminate above a railroad or transportation facilities 3. Storage bins 4 are built at an angle sufficient for grain to move therethrough by gravity. A truck platform 5 is provided on the top of the conveyer, having suitable scales 6 for weighing the grain. A receiving hopper 7 is provided for receiving the grain and delivering it by a chute 8 into the pockets 9, located around the periphery of the rotor wheel 10. As the grain is delivered through the chute 8 its velocity and weight revolve the rotor 10 in the direction of the arrow, delivering the grain at a point 11 into the chute 12. The bottom of the chute 12 is constructed of a screen or sieve 13 for removing cracked and undesirable grain and storing it within the bin 14. Blowers 15 direct an air blast through the nozzles 16, screen 13 driving the chaff and lighter particles from the grain out through the openings 17. The motive power for the blowers is delivered through the belt 18, driving pulley 19, which are fixedly mounted to the rotor 10, belt 18 drives the pulley 20, also pulley 20 drives the belt 21, delivering power to the rotor 22 of the blower 15.

Up to this point we have weighted the grain, taken out the fine particles and blown off the undesirable lighter materials, we are now ready to deliver the grain down the mountainside through the conveyer 23. In order to deliver the grain relative to its different grades, classes and qualities, a cable 24 is trained about the idler pulley 25. The cable has stops 26 secured thereon. A bullet shaped partition 27, having a slot along its one edge and an enlarged portion 29 within the slot is straddled over the cable 24 at the point 30. The groove 28 being turned up to the upper side of the partition. The rear end 31 is made of flexible material and is cut at a diagonal at 32, for completely closing the grooves 26 after it is mounted to the cable. The purpose of these partitions are to retard the speed of delivery of the grain by applying the brake band 33 to the brake drum 34 of the idler 25 by the lever 35, at the same time the partitions divide the different grades of grain being delivered.

Referring to Figure 2, when the grain reaches the lower end of the conveyer, the partitions strike against a stop 36, an inspection window 37 indicates the number of the partition, such as is indicated at 38, Figure 7. This number identifies the grade, quality and quantity of the grain to be delivered into the storage bins 4. The chute 39 is then directed to the proper bin, the stop 36 is withdrawn permitting the partitions 27 to pass on through a gate towards the idler 40, where it is released from the cable, the grain is then allowed to reach the chute 23, entering the chute 41 and delivered through the distributor chute 39 into the selected bin within the storage house 4. To permit the chute 39 to be directed to the proper bin, the chute is extensible and pivotally connected to the chute 14. These details are wholly conventional and form no part of the present invention.

The storage house 4 is built on an incline on the edge of a cliff overlooking transportation facilities, and consists of a number of bins 42. Ventilating shafts 43 are provided, of any suitable design, for ventilating the grain. Discharge chutes 44 are provided at the lower end of the bins 42. Entrance openings 50 to each bin are provided at the end 45 of the storage house for receiving the chute 39.

In the operation of my new and improved conveyer system, the grains are hauled from the surrounding highlands by suitable transportation means to the loading platform 5, where the grain is weighed then dumped into the hopper 7 and delivered into the chute 12 by the rotor wheel 10, the grain passing over the screen 13. The grain is cleaned by the blowers 15 before entering the conveyer tube 23. The different classification of grain are separated by the partitions 27 mounted to the cable 24. The grain, on reaching the lower end of the conveyer 23, is discharged into the chute 39, thence to the proper storage bin. The speed of the grain traveling down through the chute is controlled by the brake drum 25 and brake lever 33.

I do not wish to be limited to the particular mechanical embodiment herein shown, as my invention is adapted to be applied to other mechanical construction, still coming within the scope of the claims to follow.

What is claimed as new is:

1. A grain conveyer and sorter including a conveyer completely closed except at the ends and mounted for gravital flow of the grain, an endless element moving longitudinally of the conveyer, grain partitions removably engaging the element at any selected point thereon, said partitions being marked to identify the grain behind a particular partition and having end portions completely dividing the conveyer into entirely segregated grain receiving spaces for maintaining separation of the travelling masses of sorted grain, and a manually-operable stop at the discharge end of the conveyer to be engaged by the approaching partition to stop grain movement, the conveyer having an inspection opening through which the stop-interrupted partition may be inspected to determine the character of grain behind such partition.

2. A grain conveyer and separator including an inclined conveyer for gravital flow of the grain, a loading platform at the upper end of the conveyer, a plurality of receiving bins at the lower end of the conveyer, an element movable longitudinally of the conveyer under the influence of the moving grain, a stop at the lower end of the conveyer to be engaged by the element to temporarily stop the flow of grain, and a chute at the lower end of the conveyer movable for cooperation with any selected bin, and means for manually releasing the stop to permit the moving grain to be delivered to the selected bin.

3. A construction as defined in claim 2 wherein the element is marked to indicate the character of grain in the conveyer following the element.

4. A construction as defined in claim 2 wherein the element is mounted on an endless carrier having stops to cooperate with and hold the element.

5. A construction as defined in claim 2 wherein the element is mounted on an endless carrier having stops to cooperate with and hold the element, and means for controlling the movement of the endless carrier.

6. A construction as defined in claim 2 wherein the element is of elongated substantially cylindrical form having a head end facing the moving grain of substantially the internal area of the conveyor.

7. In combination with a grain conveyer completely closed except at the ends, of an endless element moving through the conveyer, stops fixed as spaced intervals on the element, and a partition having an end section to snugly and slidably fit said closed conveyer, said partition including a body extending from the end section to encircle the element, and a clip carried by the body to removably cooperate with any selected stop on the element, whereby the partitions serve to define wholly independent spaces in the conveyer for separation of grain of different grades, the removable connection of the partitions with any stop on the element permitting such different grain-grade lengths to be of any selected grain-receiving volume.

WILLIAM R. TUTTLE.